A. J. EDMONDS.
TRUCK.
APPLICATION FILED AUG. 20, 1915.

1,165,954. Patented Dec. 28, 1915.

Witnesses:

Inventor:
Arthur J. Edmonds,
By Dyrenforth, Lee, Chritton and Wiles
Attys.

Mbox# UNITED STATES PATENT OFFICE.

ARTHUR J. EDMONDS, OF MADISON, WISCONSIN.

TRUCK.

1,165,954.

Specification of Letters Patent.

Patented Dec. 28, 1915.

Application filed August 20, 1915. Serial No. 46,536.

*To all whom it may concern:*

Be it known that I, ARTHUR J. EDMONDS, a citizen of the United States, residing at Madison, in the county of Dane and State of Wisconsin, have invented a new and useful Improvement in Trucks, of which the following is a specification.

My invention relates, more particularly, to improvements in trucks for moving from place to place, articles of varying shapes, sizes and weights, such as for example railway equipment; and my object is to provide a simple and economical construction of truck adapted for the use above stated.

Figure 1:
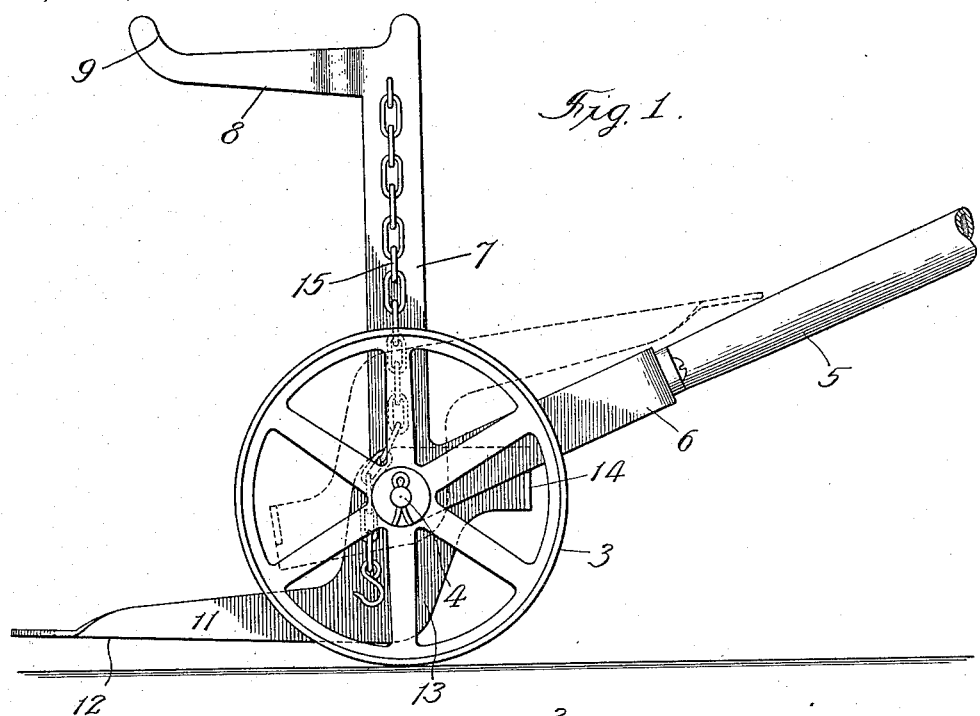
Figure 2:
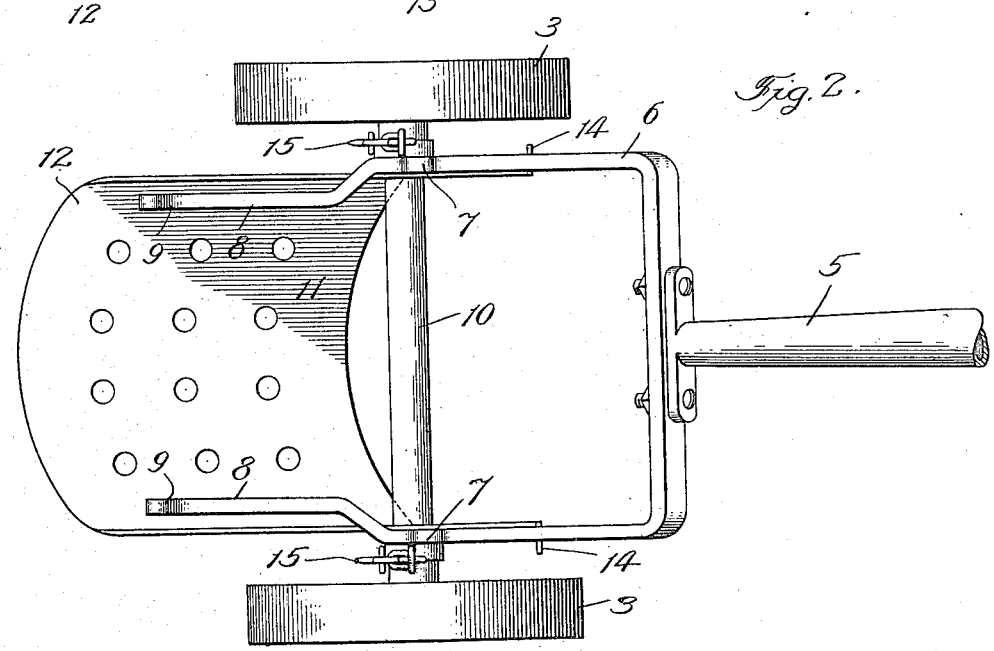

My invention is illustrated in the accompanying drawing, in which,

Figure 1 is a view in side elevation of the truck, showing the reversible platform in one position by full lines, and in the other position by dotted lines; and Fig. 2, a plan view of the truck.

The wheels of the truck, represented at 3, are journaled on the ends of an axle 4. The handle-section of the truck is represented at 5, this section terminating at its lower end in a yoke 6, preferably of metal, which contains openings in its arms through which the axle 4 extends permitting the handle to be rocked thereon. The yoke has integral therewith a pair of upwardly-extending arms 7 spaced apart with laterally and forwardly extending sections 8 having upwardly deflected ends as represented at 9, these sections preferably extending in advance of the wheels as shown. The axle 4 is preferably provided with a sleeve 10 between which and the yoke 6 a platform 11 is pivoted on the axle. The platform 11, which is shaped somewhat like a dust pan, comprises a body-section 12 with spaced arms 13 extending therefrom and at which it is pivoted on the axle, and shoulders 14, formed by lugs on the rear portions of the arms 13, which in one position of the platform engage the underside of the yoke and hold the platform as shown in full lines in Fig. 1.

It will be readily understood from the foregoing that the truck is adapted for moving from place to place articles of widely differing shapes, sizes and weights. With the platform in the position shown by full lines in Fig. 1, a box, keg, or similarly shaped article may be readily positioned on the platform 17 for transferring it from one point to another, it being understood that by reason of the engagement of the shoulders 14 with the yoke 6, the platform may be raised or lowered by rocking the handle 5 by which a relatively great leverage may be exerted on the platform. The arms 7 with their projecting sections 8 act as jacks and when the object to be moved by the truck is of such character as to permit the sections 8 to engage therewith in a manner suitable for lifting the object, as for example where the object to be moved is a jack, depressing the handle elevates the outer ends of the sections and the object engaged thereby, permitting the latter to be readily moved by the truck. When the device is used in the manner just stated, the reversible platform 12 would be swung to the position illustrated by dotted lines in Fig. 1, in which position it would rest at its body-portion upon the yoke 6. The arms 7 are preferably provided with chains 15 having hooks on their lower ends which serve to enhance the usefulness of the device. The cross-piece of the yoke 6 is preferably so disposed, as shown, relative to the axle that it may coöperate with the latter in supporting objects on the truck, such as for example railway springs. In such case the object would be so positioned on the truck that it would rest intermediate its ends on the sleeve 10 and at one end would extend under the cross-piece of the yoke 6, with the center of gravity of the object in front of the axle.

It will be noted that a truck constructed in accordance with my invention has a relatively wide field of usefulness inasmuch as it may be used in connection with articles of widely different sizes, weights and shapes.

While I have illustrated and described my invention as embodied in a particular form I do not wish to be understood as intending to limit it thereto as the same may be modified and altered without departing from the spirit of my invention.

What I claim as new and desire to secure by Letters Patent is:—

1. A truck comprising an axle, wheels on said axle, a handle supported on said axle and adapted to be rocked thereon, upwardly-extending members supported to rock with said handle and provided with extensions projecting laterally therefrom in a direction opposite to that in which said handle extends, and a reversible platform supported on said axle.

2. A truck comprising an axle, wheels on said axle, a handle supported on said axle and adapted to be rocked thereon, and a reversible platform having a body-section adapted to receive the object to be supported, and provided with lugs, said platform being pivoted on said axle intermediate its body-portion and lugs, with its lugs arranged to engage the said handle and support said body-portion in object-supporting position.

3. A truck comprising an axle, wheels on said axle, a handle supported on said axle and adapted to be rocked thereon, said handle having a yoke-section, and a reversible platform supported on said axle, said yoke being constructed and arranged to engage the end of an object superposed on said axle, for the purpose set forth.

ARTHUR J. EDMONDS.

In presence of—
HENRY T. SHELDON,
CHAUNCEY E. BLOKE.

Copies of this patent may be obtained for five cents each, by addressing the "Commissioner of Patents, Washington, D. C."